United States Patent [19]

Heeren et al.

[11] Patent Number: 5,067,659
[45] Date of Patent: Nov. 26, 1991

[54] METHOD OF TREATING REFUSE SCRAP

[75] Inventors: Evert Heeren, Weener; Hans Gotthelf, Schwerte, both of Fed. Rep. of Germany

[73] Assignee: Hoesch Werke AG, Dortmund, Fed. Rep. of Germany

[21] Appl. No.: 566,842

[22] Filed: Aug. 13, 1990

Related U.S. Application Data

[63] Continuation of Ser. No. 785,098, Oct. 4, 1985, abandoned, which is a continuation of Ser. No. 544,403, Oct. 21, 1983, abandoned.

[30] Foreign Application Priority Data

Oct. 22, 1982 [DE] Fed. Rep. of Germany ....... 3239135

[51] Int. Cl.$^5$ ............................................. B02C 23/08
[52] U.S. Cl. .................................... 241/19; 241/24; 241/23; 241/27; 241/29; 241/DIG. 38
[58] Field of Search ................... 241/14, 19, 24, 27, 241/29, 23, DIG. 38

[56] References Cited

U.S. PATENT DOCUMENTS

| 952,351 | 3/1910 | Phelps | 241/23 X |
|---|---|---|---|
| 971,405 | 9/1910 | Reed | 241/23 X |
| 2,942,792 | 6/1960 | Anderson et al. | 241/14 |
| 3,081,954 | 3/1963 | Heckett | 241/14 |
| 3,524,594 | 8/1970 | Anderson et al. | 241/24 X |
| 3,605,243 | 9/1971 | Oster | 241/29 X |
| 3,817,458 | 6/1974 | Gilberto | 241/24 X |
| 3,848,813 | 11/1974 | Stanczyk et al. | 241/19 |
| 3,905,556 | 9/1975 | Drage | 241/24 |

FOREIGN PATENT DOCUMENTS

| 674114 | 4/1939 | Fed. Rep. of Germany . |
|---|---|---|
| 1037139 | 8/1958 | Fed. Rep. of Germany . |
| 2260713 | 6/1974 | Fed. Rep. of Germany . |
| 2749380 | 5/1979 | Fed. Rep. of Germany . |
| 3022695 | 12/1981 | Fed. Rep. of Germany . |
| 3022695 | 12/1981 | Fed. Rep. of Germany . |
| 1510164 | 12/1966 | France . |
| 7606655 | 3/1976 | France . |
| 2424965 | 1/1980 | France . |
| 41985 | 3/1962 | Luxembourg . |

*Primary Examiner*—Joseph M. Gorski
*Attorney, Agent, or Firm*—Herbert Dubno; Andrew Wilford

[57] ABSTRACT

Refuse scrap from incinerated refuse or nonincinerated refuse is dried and precleaned to a metal content in excess of 70% and is then comminuted and abraded in a hammer shredder with the comminuted material being subjected to air separation and magnetic separation to yield a metal product containing at least 90% metal and with a density of at least 1 ton per m$^3$ for direct use as any other iron scrap in a steel-making plant.

6 Claims, 2 Drawing Sheets

METHOD OF TREATING REFUSE SCRAP

CROSS REFERENCE TO RELATED APPLICATIONS

This application is a file-wrapper-continuation of now abandoned patent application Ser. No. 06/785,098 filed Oct. 4, 1985 as a file-wrapper continuation of patent application Ser. No. 06/544,403 itself filed Oct. 21, 1983 with a claim to a German Oct. 22, 1982 priority, now abandoned.

FIELD OF THE INVENTION

Our present invention relates to a method of and to an apparatus for the treatment of refuse scrap, i.e. the treatment of the primarily metallic product which can be extracted in a recovery operation from incinerated or nonincinerated refuse and specifically municipal refuse.

BACKGROUND OF THE INVENTION

In recent years, with increasing concern for the environment, methods and systems have been devised to reduce the amount of refuse which must be deposited in landfills or dumped into the oceans.

Municipal refuse and garbage, for example, is increasingly processed to recover valuable components therefrom with the remainder being burned or otherwise treated so that only a reduced volume of waste need be permanently disposed of as ash or as sanitary fill. Waste and refuse processing plants recover a metallic component from the unburnt waste, this product being referred to as unburnt refuse scrap. In other systems, the refuse or garbage may be incinerated and the burnt product subjected to separation of metals, thereby yielding burnt refuse scrap.

Since the metal separation in the case of the processing of incinerator produts is effected by magnetic means, the burnt refuse scrap can contain high proportions of iron.

Consequently, the term "refuse scrap" or terms of similar significance are used herein to refer to the product having a high content in metals and generally a comparatively high proportion of ferrous metal, obtained by the processing of garbage and refuse and especially municipal garbage and refuse. The distinction between an incinerator product and a product obtained without incinerator processing can be discerned in the distinctions made between burnt and unburnt refuse scrap below.

Burnt and unburnt refuse scrap qpntain a significant proportion of nonmetallic components. As noted, the separation of iron from the nonferrous components in a refuse generally is effected in garbage and waste processing installations by magnetic separation techniques. The iron containing scrap which thus results and of which more than 90% is obtained from burnt refuse scrap, i.e. the incinerator metal scrap, has hitherto been utilized as an additive to blast furnaces. However problems have been encountered with this method of disposing or utilizing the metal scrap.

For example, by comparison with other iron sources in the form of other scraps, the refuse scrap has a low metal content (about 60 to 70%) and a proportionately higher amount of nonmetallic components. Such metal content is between 20 and 30% less than that of other scrap sources for metallurgical processes.

The refuse scrap in the past has also had a low apparent specific gravity (piled weight or bulk density) generally ranging between 0.3 to 0.4 metric ton per $m^3$. This means that large volumes of material have to be handled at high cost.

Finally, the chemical composition or analysis of the refuse scrap, especially with respect to sulfur (up to 0.1% by weight), tin (up to about 0.6% by weight) and copper, chromium and nickel, complicated metallurgical use of the refuse scrap in the aforedescribed manner.

Another disadvantage of refuse scrap, apart from its comparatively low metal content, is its comparatively high content of slag formers or slagging components. These accompanying slag formers increase the amount of slag which is produced and which thus must be handled and also are detrimental to the metallurgical process since the slag formers are overproportional by comparison to the metal added to such processes.

Indeed, the reduced basicity in terms of the ratio of calcium oxide to silicon dioxide ($CaO/SiO_2$), of the slag materials entailed for incinerator refuse slag, additional lime which had to be added in the steel-making process If additional lime is not added, the lower final basicity of the slag results in a poor sulfur distribution between the metal bath and the slag so that the steel which results may have an excessive sulfur content.

Furthermore, it has been found that the unknown and variable iron oxide content of the refuse scrap can pose a significant problem For example, it is difficult to establish the required steel tapping temperature if the amount of iron oxidc introduced with the scrap is unknown thereby leading to excessive numbers of overcooled melts which, for effective casting, must be afterblown in extra process steps at increased cost.

Indeed, the output of high-grade steel falls when afterblowing of a melt is required and significant amounts of iron can be lost because of entrainment of the iron into the slag as a result of afterblowing.

In part because of the iron oxide introduced and in part of the iron lost in the slag, added quantities of deoxidizing materials may be required at high cost and finally the larger quantities of deoxidizers which may be required tend to lead to steel of reduced purity.

OBJECTS OF THE INVENTION

It is the principal object of the present invention to provide an improved method of processing refuse scrap and especially refuse scrap now available from waste recovery installations, whereby this scrap may be utilized more effectively in steel-making processes without the disadvantages enumerated above.

Another object of the invention is to provide a plant for processing such refuse scrap.

SUMMARY OF THE INVENTION

The invention is based upon our surprising discovery that when burnt or unburnt refuse scrap as defined previously, i.e. the scrap obtained from incinerator residues or from ferrous metal separation from a nonincinerated municipal refuse, is subjected to drying and precleaning to a metal content in excess of 70% and the product is then mechanically processed at least in part by an abrasive or rubbing operation and the resulting comminuted product is then subjected to air classification or sifting and magnetic separation until the metal content is brought to a minimum of 90% and a piled weight or bulk specific gravity of at least 1 ton per $m^3$, a product is obtained which can be utilized directly in a steel-making process without increasing the need for deoxidants, without creating an imbalance between metal and scrap and, indeed, which can be used in the same manner as any other iron scrap.

Thus the method of the invention comprises the steps of:

drying and precleaning the refuse scrap (preferably in a rotary drum but also if desired in a drying cascade or vibratory sieve device) to obtain a product whose metal content is at least 70% by weight;

mechanically treating the resulting product to subject it to mechanical comminution and mechanical surface abrading or rubbing to reduce the particle size of this product and effectively rub the surfaces of the resulting particles free from iron oxide and other contaminants which may pose a problem in the final metallurgical handling of the product;

subjecting the thus comminuted and frictionally treated product to air separation, thereby removing light particles of abraded material from which metals may be recovered and leaving a more dense product;

subjecting this more dense product to magnetic separation to segregate an iron-containing component from a nonferrous component (from which metals may also be recovered); and feeding the iron-containing component, which should have a metal content of at least 90% by weight and a bulk specific gravity of at least 1 ton per $m^3$, to a steel-making plant.

The product thus introduced to the steel-making plant has a high degree of purity and a sufficient specific gravity such that it is easily handled. The most surprising thing, however, is that regardless of the varying degree of oxide content of the starting products, the final product transferred to the steel-making plant is uniform and practically free from anything which would give rise to difficulties in subsequent metallurgical processing or would require special operations such as afterblowing or deoxidants. Apparently the intensive comminution and abrading or frictional treatment of the refuse scrap removes slag-forming components, lacquer or paint layers and oxide layers from the surfaces and transforms these contaminants into light weight components which are removed in the air separation or from which the iron component is extracted by the magnetic separation. Paper, plastics rubber and like contaminants, which may have adhered to or have been entrained by the metal components, are likewise separated from the iron component.

The high density, high purity product can be charged efficiently into the steel-making apparatus and the operating costs utilizing the product of the invention are markedly reduced.

In specific terms, a number of improvements can be noted with respect to the unprocessed incinerator refuse slag.

Firstly, the lime requirements are not increased nor is the amount of slag increased on use of the product of the invention.

Secondly, because of the use of this product, a higher slag final basicity is obtained with improved sulfur distribution between the bath and the slag, the steel having a lower sulfur content as a result.

Thirdly, reproducibility is ensured and hence it is easier to set the tapping temperature.

Fourthly, a greater crude steel output is obtained because afterblowing is not necessary and iron is not entrained into the slag, less deoxidizing agents are required and as a result of the reduced amount of deoxidizing agents, the steel has higher purity.

Additional advantages are obtained when the use of the product of the invention is compared with the use of unburnt refuse scrap because of the problems introduced when large quantities of entrained papers, plastic and rubber or the like are introduced into the steel-making furnace or must be removed at the plant in the quantative way before the furnace is charged with this scrap A critical advantage over most types of earlier scrap obtained with the product of the invention is that it can be used directly because of its small particle size as a feed for modern giant blast furnaces.

We have found, moreover, that the process of the invention markedly reduces the tin content in the final product, presumably as a result of the surface action during the mechanical treatment. Apparently, the tin layer is adherent to the surface of other metal particles (in the amount of over 60%) and the mechanical operation eliminates at least a portion of this tin from the surface so that it can be separated out by the magnetic or air separation. Similarly, mechanical operation followed by the two separation steps has been found to reduce the copper, chromium and nickel contents by more than 50%.

When scrap contains the shredder scrap from the shredding of automobile bodies, it has a high tin content.

The scrap product of the invention is in its physical characteristics and as to its chemical and tin contents similar to the scrap obtained by the shredding of vehicle bodies. If the tin level obtained from the reduction in the tin content described is not satisfactory, a further tin removal operation can be provided. Preferably, the present cleaning of the refuse scrap is effective in a rotary drum, a cascade or via a vibration sieve and tends to eliminate moisture and light-weight non metallic components. It has been found to be advantageous to follow this precleaning by a dust removal operation so that there is no environmental contamination by any dust which may be present in the refuse scrap.

According to another feature of the invention, leading to increased economy, the scrap is separated into at least two fractions, namely, the large fraction and the fine fraction which are separately treated at least in part.

The separation of the scrap into fractions provides an early means of separating the scrap into two components one of which has a higher tin content than the other. For example, the component having a higher tin content can be subjected to a mechanical treatment different from that utilized for the component with the lesser tin content, thereby reducing the size of the mechanical comminuter in the abrading unit in the latter case and reducing operating and capital cost. It is indeed surprising that a size classification results in a separation of a component having a higher tin content from a component having a lower tin content. The higher tin component is generally the small size fraction.

The simultaneous drying, precleaning and fractional separation is effected, according to the invention, in a rotary drum having openings of a predetermined size and the drying process is effected either by frictional heating to generate it by rubbing of the particles against each other or by introducing heat, e.g. via a drying gas or heating of the drum.

The dust removal operation can be carried out before or simultaneously with the beginning of the mechanical treatment, e.g. mechanical comminution and rubbing of the scrap.

Since the dust collected may contain iron, the dust can be delivered to a metal residue recovery unit for, for example, chemical separation of iron and other valuable components.

Especially effective results are obtained, in accordance with the invention, when the mechanical treatment of scrap is effected until the components subjected to this treatment are in a shiny, bright or clean surface state. After the separations of the invention this assures a significant reduction in the sulfur, tin, chromium and nickel content in the product which is to be fed to the steel-making plant. The heat generated by the mechanical comminution and operation contributes to the break-down or removal of any lacquer and paint coatings.

The mechanical treatment of the refuse scrap until a bright surface is formed on the components treated has been found to remove, in the case of incinerator scrap, the extremely adherent oxide layer as well as the large proportions of sulfur which are predelivered. The sulfur content of such scrap is at least twice that of commercial scrap and has created significant problems with respect to desulfurization in the steel-making plant. The added expense of such desulfurization is avoided with the present invention.

In conjunction with the mechanical treatment and/or downstream thereof, it has been found to be advantageous to separate a large component from the small component and recycle the large component through the mechanical treatment stage thereby increasing the bulk density of the product.

According to yet another feature of the invention .the abraded material which is separated from the metallic component by the air separation step is also supplied to a metal recovery unit because it may contain comparatively large quantities of iron and tin and even copper and zinc. This increases the economic efficiency of this system.

From the magnetic separation step a residue is obtained from which copper and zinc can be recovered together with small amounts of iron. The latter is only the iron which is adherent to the other metals and thus is not retained by the magnets.

A further feature of the invention provides a detinning stage following the magnetic separation stage to remove any further undesirable amounts of tin. With the aid of this latter stage, a high purity scrap can be obtained which can be utilized in the production of steel which must have a low steel content.

Another advantage of the invention is that it is not necessary to modify process stages or even the apparatus depending on the type of refuse scrap which is processes and indeed both burnt and unburnt refuse scrap can be used and use can be made of mixtures of them without concern for the initial differences in composition although it is preferable to process them separately.

As a consequence, an apparatus for carrying out the invention can be fed continuously with the refuse scrap regardless of size and hence the charging of the apparatus can be effected by a conveyor belt or the like.

According to the apparatus concepts of the invention, the intake for the mechanical treatment device, the rotor thereof and/or the discharge side of the device can be provided with a dust removal unit. The dust removal unit can also be provided for or can serve as the air-separating device and it is advantageous to provide the air-separating and/or dust removal device with an external air source or tube.

Downstream of the mechanical treating device, a separating grate can be provided which can have openings in the form of regular triangles or squares with individual cross sectional areas of about 50 cm$^2$ and it has been found to be advantageous to utilize as a mechanical comminuting and abrading device a shredder of the hammermill type whose rotor is operated with a power consumption of 60 to 70% of the maximum power or load capacity of the machine.

Test results are obtained with a 1000 P.S. shredder which has 20% more hammers than the conventional automobile body shredder, is operated with a power consumption of 60 to 70 amperes and, in the best mode embodiment of the invention, has fourteen hammers mounted on six shafts of the machine. The first, third, fourth and sixth shafts can each have two diametrically opposite hammers while the second and fifth shafts can each have three angularly equispaced hammers. The weight of each hammer should be about 25% less than the weight of the hammer of an automobile shredder and each hammer should have at its free end a circular arm surface whose center of curvature corresponds to the pivot at which the hammer is secured to the shaft.

BRIEF DESCRIPTION OF THE DRAWING

The above and other objects, features and advantages of the present invention will become more readily apparent from the following description reference being made to the accompanying drawing in which.

SPECIFIC DESCRIPTION

Figure 1:
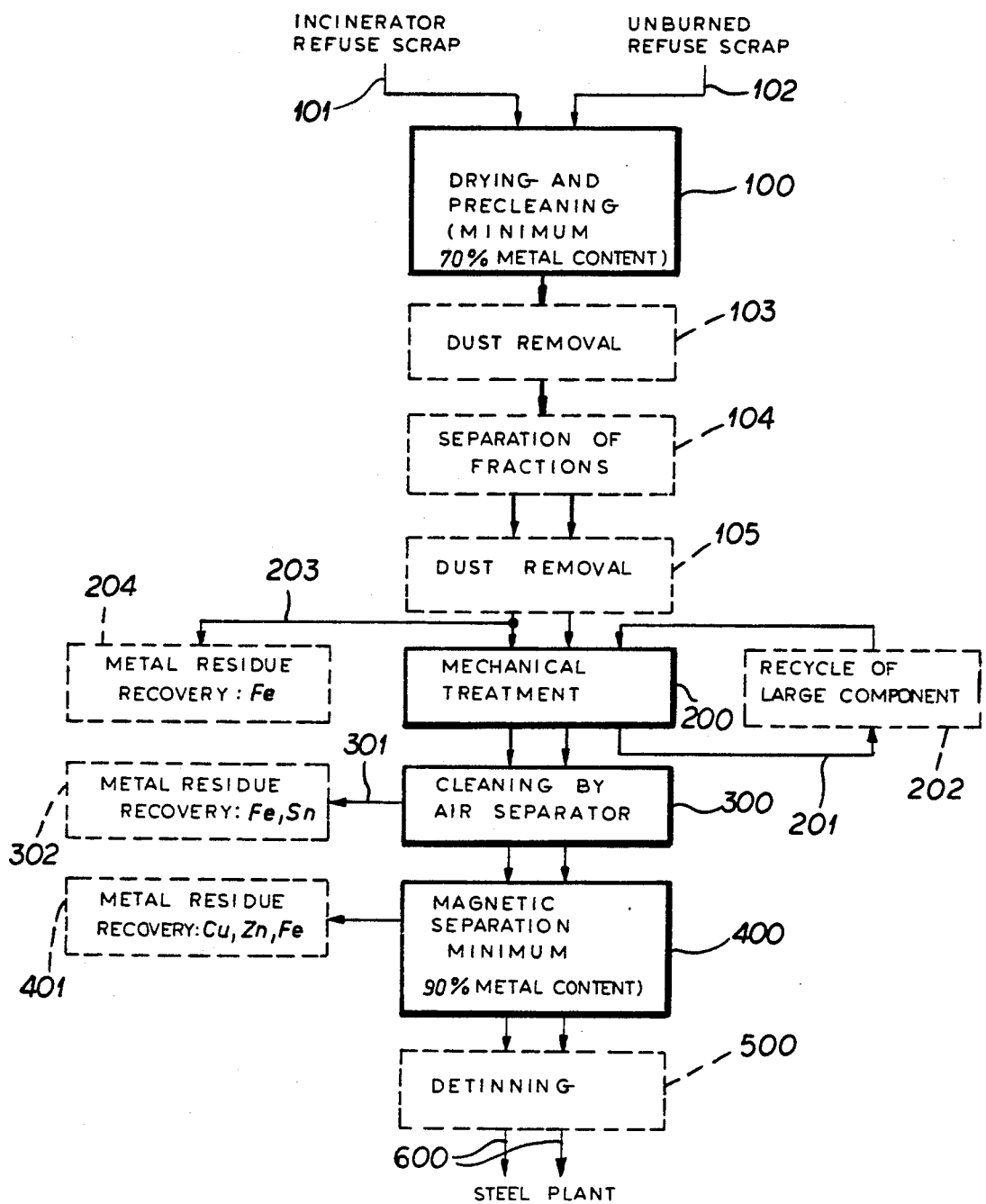
FIG. 1 is process flow diagram for the invention.
Figure 2:
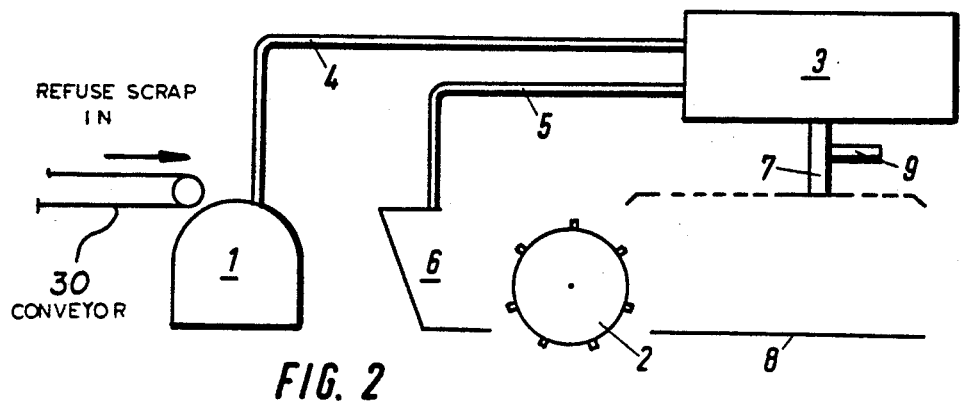
FIG. 2 is a diagram illustrating the connection of the dust removal device in an apparatus for carrying out the invention.

As will be apparent from FIG. 1, either incinerator or burnt refuse scrap or unburnt refuse scrap may be fed continuously at 101 and 102, respectively, in any proportions, via continuous conveyor belts to a drying and precleaning drum represented by the first stage 100 in FIG. 1 and by the drying drum unit 1 and the conveyor 30 feeding it in FIG. 2. This unit is provided with dust removal facilities as represented at 103 and, simultaneously with the removal of the dust-free product which has a minimum metal content of 70%, the product can be separated into fractions as represented by the double arrows leaving the separation stage 104. The separation at 104 can be a grading by size utilizing a grate passing particles of the smaller size and retaining particles of the larger size.

After grading at 104, or during such grading, another dust removal stage 105 can be provided Each of the two fractions is then submitted to the mechanical treatment at 200 in a shredding hammermill as will be described in greater detail hereinafter, the shredding hammermill abrading the comminuted particles until the surfaces thereof are shining.

As the material passes continuously from the hammermill it can pass over a grate which will also be described in connection with FIGS. 6 and 7 so that large components can be separated at 201 and recycled at 202 to the hammermill. During operation of the hammermill dust removal as represented at 203, recovers particulates which may be subjected to metal residue recovery at 204, thereby separating iron dust if desired.

Following the mechanical treatment, the mass is subjected to air separation at 300, i.e. air is blown through the comminuted product from the hammermill, with the particulates being fed at 301 to a metal recovery stage 302 where iron and tin can be separated out.

From the air separator stage, the two components are separately subjected to magnetic separation at 400 with the magnetically attractable product, containing a minimum of 90%
metal and having a bulk density of at least one ton per m$^3$, being subjected to detinning at a stage 500 by premetallurgical processes, if desired, before the product is fed at 600 to the steel plant.

The nonmagnetic residue at 401 is subjected to recovery for copper, zinc and adherent iron.

In FIG. 1, the stages illustrated in broken lines are optional but preferred to the best mode embodiment whereas the stages illustrated in solid lines are essential to the invention.

As can be seen from FIG. 2, the drying and precleaning drum 1, the shredder 2 and the discharge part of the shredder represented at 8 can each be provided with a dust separator or dust recovery unit as has been represented at 3 or a common dust separator can be connected to these elements as represented by the lines 4, 5 and 7.

The duct 7 can also be provided with a separate air inlet 9 which can reduce the suction force downstream of the shredder, where the suction force functions as an air separator, so that a minimum of iron is entrained from the comminuted product.

Figure 3:
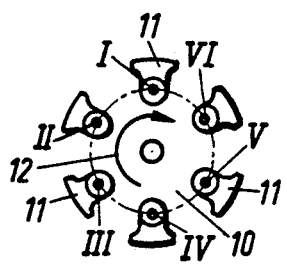
FIG. 3 is an elevational view of the lay-out of the hammers of a rotor.

As can be seen from FIG. 3, the rotor 10 of the shredder can have six shafts represented by the numerals I through VI and can be driven in the direction of arrow 12. Each of these shafts can pivotally carry a plurality of hammers 11 and each of the hammers 11 (FIG. 5) can have a free end of circular arc configuration as shown at 13 while being pivctally mounted at 14 at the center of curvature of the surface 13.

Figure 4:
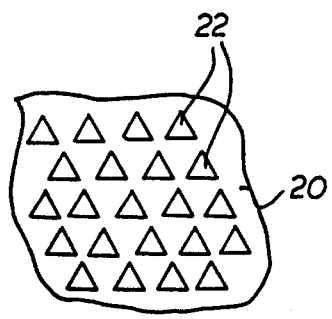
FIG. 4 is a table showing the number of hammers provided on each rotor shaft.

As can be seen from the table of FIG. 4, the six shafts I through VI can have hammers A through L so that 14 hammers can be provided in all with 3 hammers being provided in the shafts II and V while the other hammers are provided in diametrically opposite paths on each of the other shafts.

Figures 5, 6, 7:
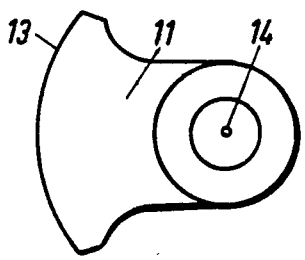
FIG. 5 is an elevational view of the rotor.
FIG. 6 is a plan view of a portion of a grate downstream of the mechanical treatment device.
FIG. 7 is a view similar to FIG. 6 showing another embodiment of the grate.

Downstream of the hammermill, the scrap can pass over grates 20 and 21 as shown in FIGS. 6 and 7 which can be provided with regular triangular openings 22 or square openings 23 with cross sectional areas of about 50 cm$^2$ so that the retained larger pieces can be recyled to the mill.

We claim:

1. A method of converting municipal refuse into a product suitable for use as iron scrap in a blast furnace, said method comprising in the following order the steps of:
   (a) processing the municipal refuse in a waste-treatment plant by classifying and comminuting the refuse, thereby producing treated refuse scrap;
   (b) drying and precleaning said treated refuse scrap sufficiently such that a scrap product whose metal content is in excess of 70% by weight is produced;
   (c) mechanically comminuting and abrading said scrap product with a shredder operating at about 60% to 70% maximum capacity, thereby reducing the scrap product to particles and also simultaneously removing material of metallic surfaces of the particles by rubbing the particles together;
   (d) air separating said particles, thereby producing a heavy product and a light product;
   (e) magnetically separating said heavy product thereby recovering a magnetically separable particle fraction having a metal content of at least 90% by weight and a bulk density of at least 1.0 ton/m$^3$; and
   (f) introducing said magnetically separable particle fraction into the blast furnace as iron scrap.

2. The method defined in claim 1, further comprising the step of:
   (b') separating dust from said scrap product following step (b) and prior to step (c).

3. The method defined in claim 1, further comprising the step of
   (c') separating large particles from the comminuted material of said shredder and recycling said large particles to said hredder for further comminution.

4. The method defined in claim 1, further comprising the step of:
   (c') detinning the magnetically separable particle fraction of step (e) prior to introducing said magnetically separable particle fraction into the blast furnace in step (f).

5. The method defined in claim 1 including processing refuse with heat and burning the refuse in step (a).

6. a method of converting refuse into a product suitable for use as iron scrap in a blast furnace, the method comprising in the following order the steps of:
   (a) processing the refuse in a waste-treatment plat by burning, classifying, and comminuting the refuse, thereby producing treated refuse scrap;
   (b) drying and precleaning the treated refuse scrap sufficiently such that a scrap product whose metal content is in excess of 70% is produced;
   (c) separating dust from the scrap product;
   (d) mechanically comminuting and abrading the scrap product with a shredder operating at about 60% to 70% maximum capacity, thereby reducing the scarp product to particles and also simultaneously removing material of metallic surfaces of the particles by rubbing the particles together;
   (e) separating large particles from the comminuted and abraded scrap product and recycling the large particles to the shredder for further comminution;
   (f) air separating the particles, thereby producing a heavy product and a light product;
   (g) magnetically separating the heavy product, thereby recovering a magnetically separable particle fraction having a metal content of at least 90% by weight and a bulk density of at least 1.0 t/m$^3$
   (h) detinning the magnetically separated particle fraction; and
   (i) introducing the detinned and magnetically separable particle fraction into the blast furnace as iron scrap.

* * * * *